(12) United States Patent
Hibino (10) Patent No.: US 8,545,357 B2
(45) Date of Patent: Oct. 1, 2013

(54) GEAR TRANSMISSION

(75) Inventor: Toshiharu Hibino, Tsu (JP)

(73) Assignee: Nabtesco Corporation, Tokyo (JP)

( * ) Notice: Subject to any disclaimer, the term of this patent is extended or adjusted under 35 U.S.C. 154(b) by 749 days.

(21) Appl. No.: 12/312,748

(22) PCT Filed: Dec. 12, 2007

(86) PCT No.: PCT/JP2007/073958
§ 371 (c)(1),
(2), (4) Date: May 26, 2009

(87) PCT Pub. No.: WO2008/075598
PCT Pub. Date: Jun. 26, 2008

(65) Prior Publication Data
US 2010/0056316 A1      Mar. 4, 2010

(30) Foreign Application Priority Data
Dec. 21, 2006   (JP) .................................. 2006-344639

(51) Int. Cl.
*F16H 1/32*   (2006.01)
(52) U.S. Cl.
USPC .......................................... 475/178; 475/162
(58) Field of Classification Search
None
See application file for complete search history.

(56) References Cited

U.S. PATENT DOCUMENTS

| 5,286,235 | A | * | 2/1994 | Gerat | ........................... 475/162 |
| 5,655,985 | A | | 8/1997 | Herstek | |
| 2003/0224893 | A1 | | 12/2003 | Tsurumi | |
| 2006/0199692 | A1 | | 9/2006 | Janek | |

FOREIGN PATENT DOCUMENTS

| DE | 28 35 973 A1 | 2/1980 |
| EP | 1 666 765 A1 | 6/2006 |
| JP | A-1-150044 | 6/1989 |
| JP | A-9-14359 | 1/1997 |
| JP | A-2001-187945 | 7/2001 |
| JP | A-2006-200557 | 8/2006 |
| WO | WO 94/16243 A1 | 7/1994 |
| WO | WO 2006/077825 A1 | 7/2006 |

OTHER PUBLICATIONS

Office Action issued in European Patent Application No. 07850509.6 mailed on Oct. 12, 2010.

(Continued)

*Primary Examiner* — Erin D Bishop
(74) *Attorney, Agent, or Firm* — Oliff & Berridge, PLC (57) ABSTRACT

An external gear has a number of teeth differing from a number of teeth of an internal gear, and is maintaining in a meshing state with the internal gear. A center through hole and an offset through hole are formed in the external gear. The center through hole is formed at the center of the external gear, whereas the offset through hole is formed at a position offset from the center of the external gear. Column-shaped member of a carrier passes through the offset through hole. A pair of supporting members of the carrier respectively supports each end of the column-shaped member. A pair of grooves is formed on a surface of a shaft of a crank member at positions between which an eccentric rotation member of the crank member is interleaved. First rolling elements and first outer races are arranged between the supporting members and the grooves. The shaft of the crank member is supported so as to be capable of rotating with respect to the carrier and incapable of moving in its axial direction.

5 Claims, 7 Drawing Sheets

(56) References Cited

OTHER PUBLICATIONS

Mar. 1, 2010 Search Report issued in European Patent Application No. 07850509.6.
Office Action issued in Chinese Patent Application No. 200780047340.8 dated Apr. 6, 2011 (with partial translation).
Dec. 4, 2012 Office Action issued in Japanese Patent Application No. 2008-550114 (with translation).
Notification of Reason for Rejection dated Jul. 30, 2013 from Japanese Patent Application No. 2008-550114 (with English-language translation).

* cited by examiner

GEAR TRANSMISSION

TECHNICAL FIELD

The present application claims priority to Japanese Patent Application No. 2006-344639 filed on Dec. 21, 2006, the contents of which are hereby incorporated by reference into the present specification.

The present invention relates to a gear transmission utilized in an industrial robot or a machine tool, etc. In particular, the present invention relates to a technique for reducing the number of parts constituting the gear transmission.

BACKGROUND ART

An internal gear and an external gear having a number of teeth differing from a number of teeth of the internal gear are provided, and the external gear is disposed in a position in which the external gear is surrounded by the internal gear while meshing with the internal gear. The external gear rotates with respect to the internal gear when the external gear is caused to revolve orbitally around an axis line of the internal gear while the external gear and the internal gear are maintaining the meshing state, i.e. when the external gear is caused to rotate eccentrically around the axis line of the internal gear. An inner meshing planetary gear type gear transmission that utilizes this phenomenon has been developed, and is disclosed for example in Japanese Patent Application Publication No. 2001-187945. The conventional gear transmission comprises an internal gear, an external gear, a carrier, a crank member, and bearings.

The external gear has a number of teeth differing from a number of teeth of the internal gear. The external gear is capable of rotating while revolving orbitally around an axis line of the internal gear while in a meshing state with the internal gear. The external gear is disposed in a position surrounded by the internal gear. The external gear has a center through hole at its center, and a plurality of offset through holes is formed at positions offset from its center.

The carrier comprises column-shaped members and a pair of supporting members. Each of the column-shaped members passes through the respective offset through hole of the external gear. The pair of supporting members respectively supports each ends of the column-shaped members. Further, the pair of supporting members is supported by the internal gear in a state allowing the pair of supporting members to rotate around the axis line of the internal gear. A space is maintained between each of the column-shaped members and the respective offset through hole that corresponds thereto. That is, the carrier allows the external gear to revolve orbitally around the axis line of the internal gear, and the carrier rotates around the axis line of the internal gear together with the rotation of the external gear.

The crank member comprises a shaft, an eccentric rotation member, and an input gear. The shaft passes through the center through hole of the external gear. The eccentric rotation member has an axis line of rotation at a position offset from an axis line of the shaft and is fitted in the center through hole of the external gear. The shaft is capable of rotating with respect to the carrier. The input gear is fixed to the shaft, and causes the shaft to rotate.

The bearings are each disposed between the respective supporting member of the carrier and the shaft of the crank member. Further, the bearings are disposed as a pair at positions between which the eccentric rotation member of the crank member is interleaved. The shaft of the crank member is supported by the pair of bearings such that the shaft is capable of rotating with respect to the carrier and is not capable of moving in an axial direction of the carrier.

A pair of additional bearings is further disposed between the internal gear and the supporting members of the carrier. The carrier is supported by the pair of additional bearings such that the carrier can rotate with respect to the internal gear.

Since the above configuration is provided, when the input gear of the crank member rotates, the shaft of the crank member rotates, and the eccentric rotation member of the crank member rotates eccentrically. When the eccentric rotation member of the crank member rotates eccentrically, the external gear rotates with respect to the internal gear while revolving orbitally around the axis line of the internal gear. When the external gear rotates, the carrier rotates with respect to the internal gear.

In the inner meshing planetary gear type gear transmission, the crank member must be supported so as to be capable of rotating with respect to the pair of supporting members of the carrier and so as to be incapable of moving in the axial direction of the carrier. In the conventional gear transmission, the crank member is supported so as to be capable of rotating with respect to the carrier and so as to be incapable of moving in the axial direction of the carrier by disposing a pair of tapered roller bearings between the pair of supporting members and the shaft of the crank member. Further, the carrier must be supported so as to be capable of rotating around the axis line of the internal gear. In the conventional gear transmission, the carrier is supported so as to be capable of rotating around the axis line of the internal gear by disposing a pair of tapered roller bearings between the internal gear and the pair of supporting members of the carrier. In the conventional gear transmission, the number of parts constituting the gear transmission is large, and the cost of the gear transmission therefore is high.

DISCLOSURE OF INVENTION

Problem to be Solved by the Invention

There is a demand for manufacturing a gear transmission at low cost yet maintaining its performance. The cost of the parts and also the cost of assembly can be reduced by reducing the number of parts of the gear transmission. In the present invention, a technique is realized for reducing the number of parts of the gear transmission and thereby presenting a low cost gear transmission.

Means to Solve the Problem

A gear transmission of the present description comprises an internal gear, an external gear, a carrier, and a crank member. The external gear has a number of teeth differing from a number of teeth of the internal gear. Further, the external gear is capable of revolving orbitally around an axis line of the internal gear while in a meshing state with the internal gear. That is, the external gear is capable of rotating eccentrically around the axis line of the internal gear. Moreover, the external gear is also capable of rotating with respect to the internal gear. Further, the external gear is disposed in a position surrounded by the internal gear. The external gear has a center through hole at its center, and an offset through hole at a position that is offset from its center. The carrier comprises a column-shaped member and a pair of supporting members. The column-shaped member passes through the offset through hole of the external gear. The pair of supporting members respectively supports each end of the column-shaped member and is supported by the internal gear in a state allowing the pair of supporting members to rotate around the axis line of the internal gear. The crank member comprises a shaft and an eccentric rotation member. The shaft passes through the center through hole of the external gear. The eccentric rotation member has an axis line of rotation at a position offset from an axis line of the shaft and is fitted in the center through hole of the external gear. A pair of grooves is formed on the surface of the shaft at positions between which the eccentric rotation member is interleaved. First rolling elements and first outer races are arranged between the supporting members of the carrier and the grooves whereby the crank member is supported such that the crank member is capable of rotating with respect to the carrier and its movement in an axial direction of the carrier is restricted.

In the above gear transmission, when an input gear of the crank member rotates, the eccentric rotation member of the crank member rotates eccentrically. When the eccentric rotation member rotates eccentrically, the external gear rotates with respect to the internal gear while revolving orbitally around the axis line of the internal gear. When the external gear rotates, the carrier rotates with respect to the internal gear. The above gear transmission typically reduces the number of rotations of the crank member by utilizing the difference in number of teeth between the internal gear and the external gear, and can be utilized as a gear transmission in which the carrier rotates with respect to the internal gear.

In the above gear transmission, for the crank member is supported so as to be capable of rotating with respect to the carrier, only the first rolling elements and the first outer races are disposed instead of bearings that have inner races, rolling elements and outer races between the crank member and the carrier. That is, the inner races can be omitted. The number of parts of the gear transmission can thereby be reduced, and a low cost gear transmission can be provided.

In the gear transmission of the present description, a through hole extending along the axis line of the crank member may be formed in the shaft of the crank member.

In the above gear transmission, wiring or piping, etc. can pass through the interior of the through hole. In the gear transmission of the present description, as described above, for the crank member is supported so as to be capable of rotating with respect to the carrier, only the first rolling elements and the first outer races are disposed between the crank member and the carrier. Since the inner races are omitted, the inner diameter of the through hole extending along the axis line can thus be increased by the size of the omitted inner race compared to the conventional gear transmission in which inner races, rolling elements, and outer races are disposed.

In the gear transmission of the present description, a groove extending along a circumferential direction may be formed on an outer surface of the eccentric rotation member, and second rolling elements may be arranged between the groove and the center through hole of the external gear.

According to the above gear transmission, the eccentric rotation member is capable of rotating smoothly in the center through hole of the external gear. Further, it is possible to prevent the second rolling elements from moving in the axial direction of the crank member by inserting these second rolling elements into the groove. Since it is consequently possible to omit a member for preventing movement of the second rolling elements in the axial direction of the crank member, it is possible to further reduce the number of parts of the gear transmission.

In the gear transmission of the present description, second rolling elements may be arranged between the eccentric rotation member and the center through hole of the external gear, and movement of the second rolling elements in the axial direction of the crank member may be restricted by the first outer race.

In the above gear transmission, as well, it is possible to prevent the second rolling elements from moving in the axial direction of the crank member. It is possible to omit a member for preventing the movement of the second rolling elements in the axial direction of the crank member.

In the gear transmission of the present description, it is preferred that a pair of additional grooves is formed in the pair of supporting members at positions facing the internal gear respectively, and that third rolling elements and second outer races are arranged between the internal gear and the respective additional grooves, whereby the pair of supporting members is supported such that the pair of supporting members is capable of rotating with respect to the internal gear and their movement in the axial direction of the internal gear is restricted.

According to the above gear transmission, the number of parts of the gear transmission can be further reduced. That is, inner races between the internal gear and the pair of supporting members can be omitted. In addition to this, the distance between the internal gear and the pair of supporting members can be reduced by omitting the inner races. In other words, since the diameter of the internal gear can be reduced, a compact gear transmission can be realized.

Effects of the Invention

According to the gear transmission of the present description, the number of parts of the gear transmission can be reduced. Reducing the number of parts allows a low cost gear transmission to be realized.

EMBODIMENTS OF THE INVENTION

Some of the features of the present embodiments will be described below.

Figure 1:
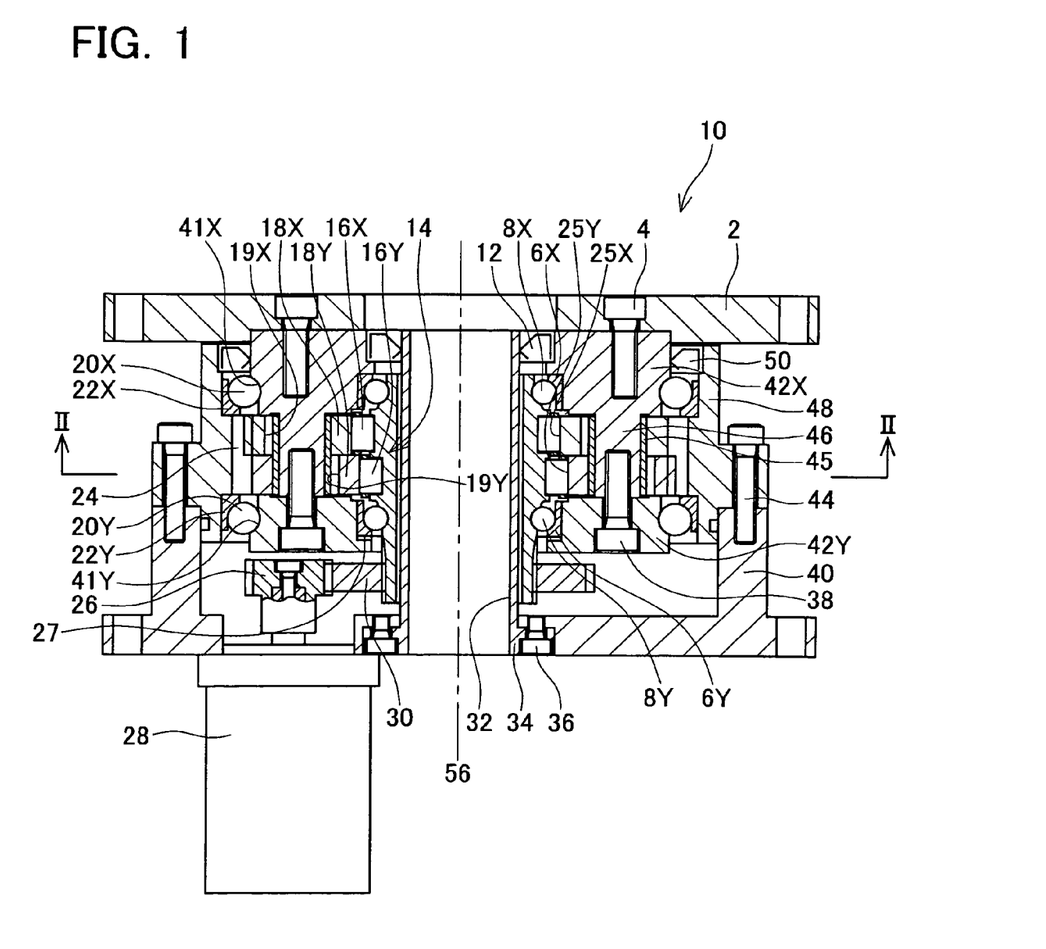
FIG. 1 shows a cross-sectional view of a gear transmission of a first embodiment.

(First Feature) A cylindrical member 34 is fixed by a bolt 36 to an input side member 40 fixed to a motor 28. The cylindrical member 34 is fixed so as to be incapable of rotating with respect to the motor 28. An oil seal 12 is disposed between the cylindrical member 34 and a supporting member 42X attached to an output side member 2. (FIG. 1)

Figure 7:
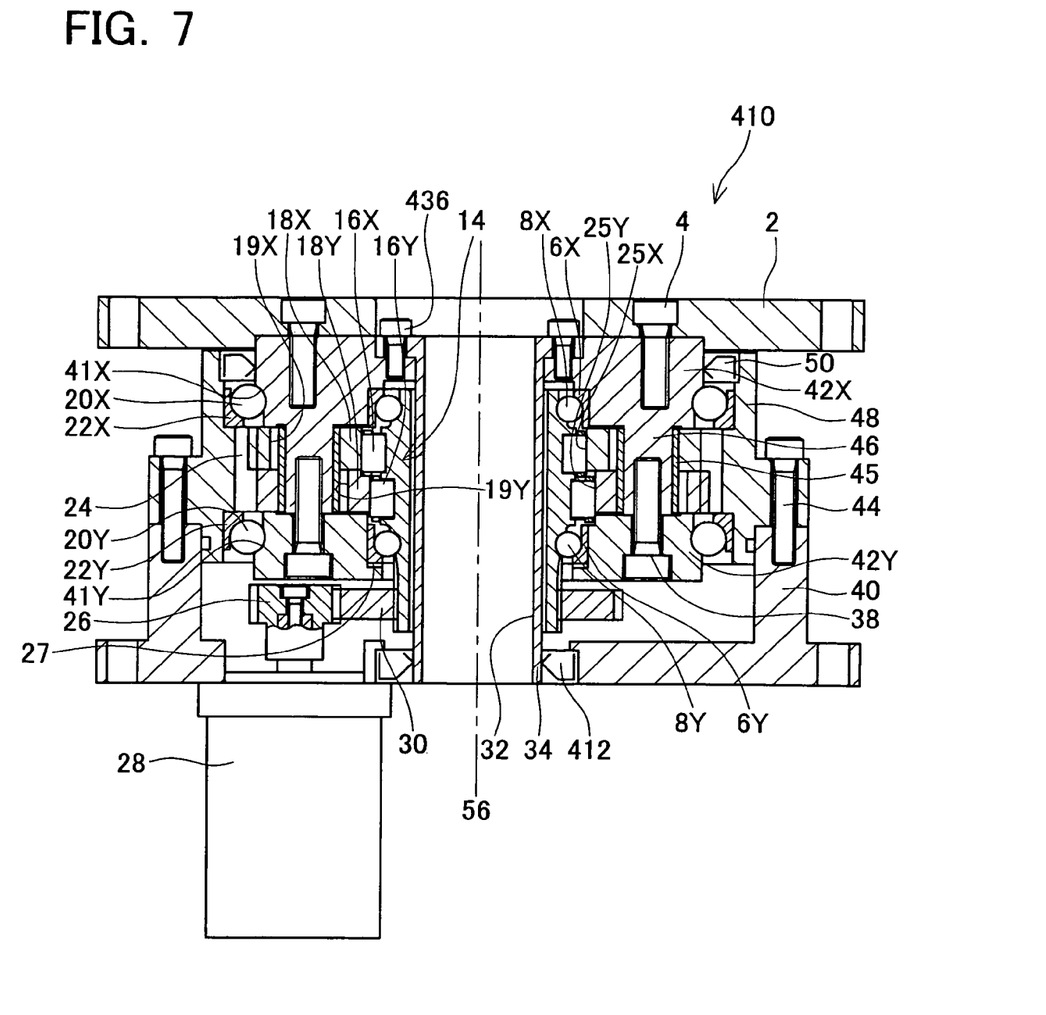
FIG. 7 shows a cross-sectional view of a gear transmission of a fourth embodiment.

(Second Feature) The cylindrical member 34 is fixed by a bolt 436 to the output side member 2. The cylindrical member 34 is fixed so as to be incapable of rotating with respect to the output side member 2. An oil seal 412 is disposed between the input side member 40 and the cylindrical member 34. (FIG. 7)

(Third Feature) A spline 62 is formed on a shaft 60 of a crank member 14, and a spur gear 30 is fixed to the spline 62. The spur gear 30 meshes with a motor gear 26.

(Fourth Feature) A preload adjustment member 27 for adjusting the preload between the crank member 14 and a pair of supporting members 42X and 42Y is disposed between the supporting member 42Y and an outer race 6Y.

Embodiments will be described below with reference to figures.

In the embodiments below, a description is given as an example of a reduction gear transmission that reduces the speed of a motor gear fixed to a motor and outputs the reduced rotation. However, the technique of the present invention is not restricted to a reduction gear transmission, but may also be applied to a gear transmission (a speed increasing device) that increases the speed of the rotation of the motor gear and outputs the increased rotation.

(First Embodiment)

Figure 2:
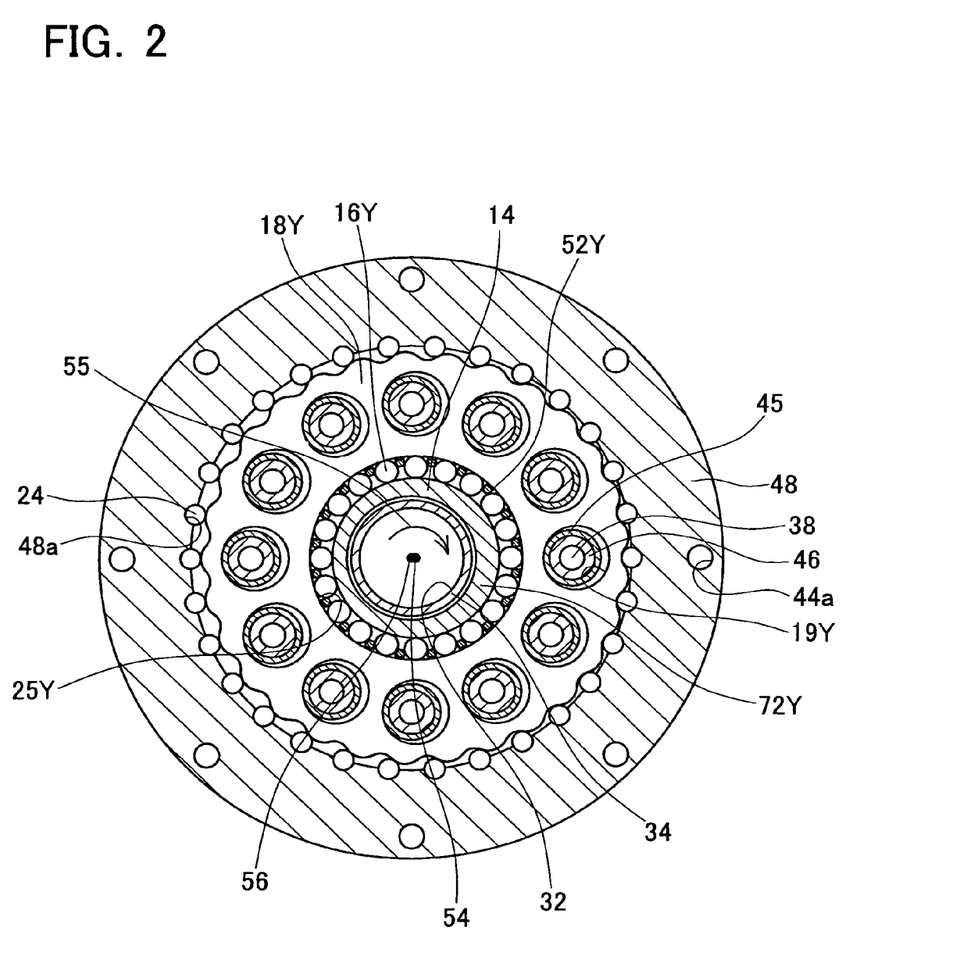
FIG. 2 shows a cross-sectional view along the line II-II of FIG. 1.
Figure 3:
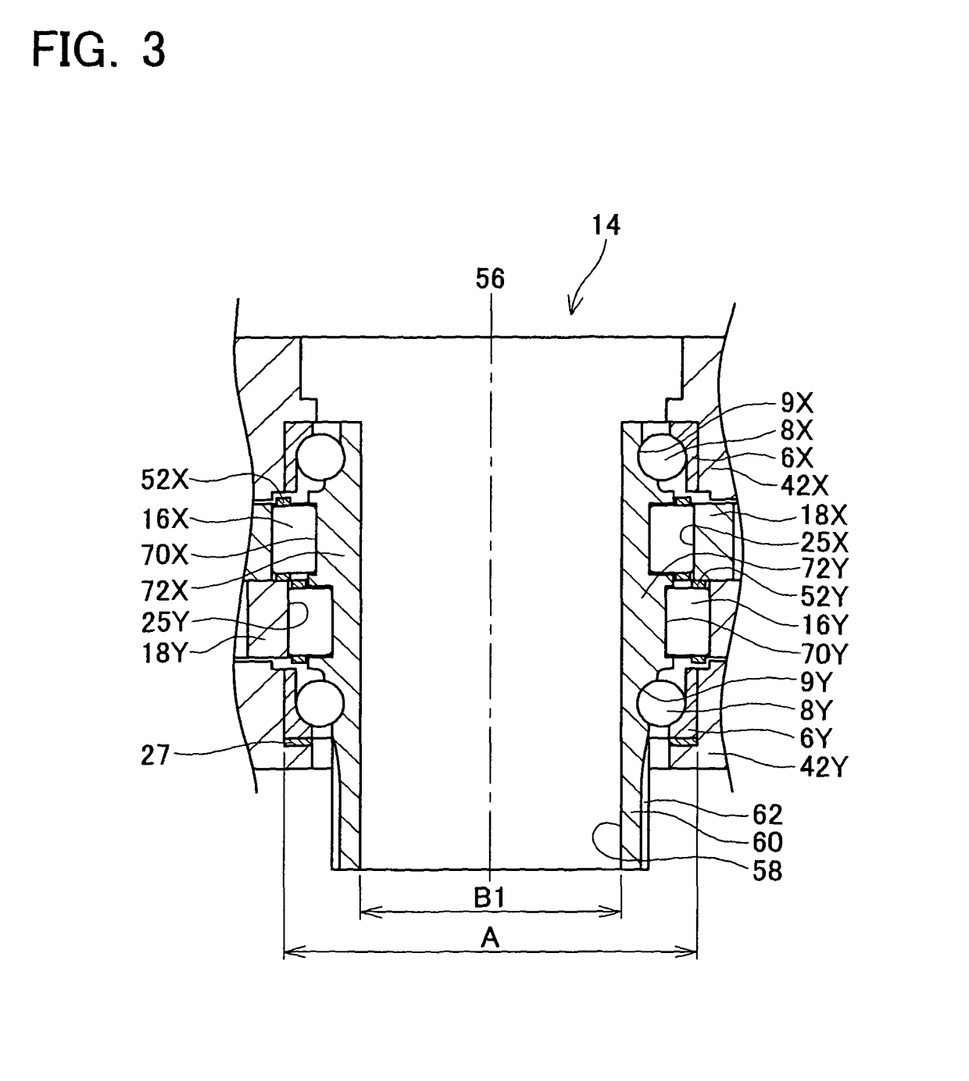
FIG. 3 shows an enlarged view of a crank member of the gear transmission of the first embodiment and the surroundings of the crank member.

FIG. 1 shows a cross-sectional view of essential parts of a gear transmission 10 of the present embodiment. FIG. 2 shows a cross-sectional view along the line II-II of FIG. 1. FIG. 3 shows an enlarged view of a crank member 14 (to be described) and the surroundings of the crank member 14.

In general, the gear transmission 10 comprises an internal gear 48, external gears 18X and 18Y, a carrier, and the crank member 14.

As shown in FIG. 2, the external gear 18Y has a number of teeth differing from a number of teeth of the internal gear 48. Further, the external gear 18Y is disposed at an inner side of the internal gear 48 while in a meshing state with the internal gear 48. In fact, the external gear 18Y meshes with the internal gear 48 via inner gear pins 24. The external gear 18Y is capable of revolving orbitally around an axis line 56 of the internal gear 48. In other words, the external gear 18Y is capable of rotating eccentrically around the axis line 56 of the internal gear 48. Further, the external gear 18Y is capable of rotating with respect to the internal gear 48. A center through hole 25Y is formed in the center of the external gear 18Y. A plurality of offset through holes 19Y is formed at positions offset from the center of the external gear 18Y. Twelve offset through holes 19Y are formed equidistantly along a circumferential direction of the external gear 18Y.

As shown in FIG. 1, the gear transmission 10 comprises the pair of external gears 18X and 18Y. The description of the external gear 18Y given above can also be applied to the external gear 18X. That is, a center through hole 25X is formed in the center of the external gear 18X, and twelve offset through holes 19X are formed equidistantly along a circumferential direction of the external gear 18X at positions offset from the center of the internal gear 48. The external gears 18X and 18Y mesh with the internal gear 48 via the common inner gear pins 24.

As shown in FIG. 1, the carrier is formed from column-shaped members 46 and a pair of supporting members 42X and 42Y. In the description below, the column-shaped members 46, the supporting member 42X, and the supporting member 42Y may be grouped together and termed a carrier 42. Each of the column-shaped members 46 passes through the respective offset through hole 19X of the external gear 18X and through the respective offset through hole 19Y of the external gear 18Y. A pair of additional grooves 41X and 41Y is formed on the pair of supporting members 42X and 42Y at respective positions facing the internal gear 48. The supporting member 42X and the supporting member 42Y are fixed by a bolt 38. The supporting members 42X and 42Y are each supported so as to be capable of rotating with respect to the internal gear 48 and incapable of moving in its axial direction, by the groove 41X, a ball (a third rolling element) 20X and an outer race (a second outer race) 22X and by the groove 41Y, a ball 20Y and an outer race 22Y, respectively. As shown in FIGS. 1 and 2, the column-shaped members 46 are formed so as to extend from the supporting member 42X. Inner rollers 45 are disposed at an outer side of the column-shaped members 46. The inner rollers 45 are disposed so as to be capable of rotating with respect to the column-shaped members 46. Twelve column-shaped members 46 are disposed equidistantly along a circumferential direction of the supporting member 42X. A space is formed between each of the column-shaped members 46 and the respective offset through holes 19X of the external gear 18X, this space allows the external gear 18X to revolve orbitally around the axis line 56 of the internal gear 48. A space is formed between each of the column-shaped members 46 and the respective offset through holes 19Y of the external gear 18Y, this space allows the external gear 18Y to revolve orbitally around the axis line 56 of the internal gear 48.

The pair of supporting members 42X and 42Y is formed in positions such that the external gears 18X and 18Y are interleaved therebetween from above and below the axis line 56. The supporting member 42X and the supporting member 42Y are fixed by the bolt 38. The movement of the external gears 18X and 18Y in the direction of the axis line 56 can be restricted by the pair of supporting members 42X and 42Y. Further, the gear transmission 10 is prevented by the pair of supporting members 42X and 42Y from distorting in a direction orthogonal to the axis line 56 while the gear transmission 10 is operating. That is, the torsional rigidity of the gear transmission 10 can be increased by the pair of supporting members 42X and 42Y.

FIG. 3 shows an enlarged view of the crank member 14 and the surroundings of the crank member 14. The cylindrical member 34, an oil seal 12, and an input gear 30 (to be described) are not shown. The configuration of the crank member 14 of the gear transmission 10 will be described with reference to FIG. 3.

In general, the crank member 14 comprises the shaft 60, eccentric rotation members 72X and 72Y, and the input gear 30 (see FIG. 1). The crank member 14 passes through the center through hole 25X of the external gear 18X and through the center through hole 25Y of the external gear 18Y. A spline 62 is formed at an end part of a lower side with respect to the drawing, of the shaft 60. The input gear 30 (see FIG. 1) can be fixed to the shaft 60 by the spline 62.

The eccentric rotation member 72X has an axis line of rotation at a position offset from the axis line 56 of the shaft 60 (this axis line being the same as the axis line 56 of the internal gear 48 shown in FIG. 2). Further, the eccentric rotation member 72X fits into the center through hole 25X of the external gear 18X via cylindrical roller bearings (second rolling elements) 16X. The eccentric rotation member 72X can rotate by means of the cylindrical roller bearings 16X while in a fitting state within the center through hole 25X of the external gear 18X.

The eccentric rotation member 72Y has an axis line of rotation at a position offset from the axis line 56 of the shaft 60. Further, the eccentric rotation member 72Y fits into the center through hole 25Y of the external gear 18Y via cylindrical roller bearings 16Y. The eccentric rotation member 72Y can rotate by means of the cylindrical roller bearings 16Y while in a fitting state within the center through hole 25Y of the external gear 18Y.

A pair of grooves 9X and 9Y is formed on a surface of the shaft 60 at positions on which the eccentric rotation members 72X and 72Y are interleaved therebetween. Balls (first rolling elements) 8X and an outer race (a first outer race) 6X are disposed between the supporting member 42X and the groove 9X. Balls 8Y and an outer race 6Y are disposed between the supporting member 42Y and the groove 9Y. In the present embodiment, the groove 9X, the balls 8X, and the outer race 6X constitute an angular ball bearing, and the groove 9Y, the balls 8Y, and the outer race 6Y also constitute an angular ball bearing. The shaft 60 of the crank member 14 is supported by the pair of angular ball bearings so as to be capable of rotating with respect to the carrier 42 and incapable of moving in an axial direction of the carrier 42. That is, the crank member 14 is supported so as to be capable of rotating with respect to the pair of supporting members 42X and 42Y and incapable of moving in an axial direction of the pair of supporting members 42X and 42Y.

A groove 70X that extends in a circumferential direction is formed on an outer circumference face of the eccentric rotation member 72X. The cylindrical roller bearings (the second rolling elements) 16X are disposed between the groove 70X and the center through hole 25X of the external gear 18X. Since a part of the cylindrical roller bearings 16X are housed within the groove 70X, the movement of the cylindrical roller bearings 16X in the axial direction is restricted.

A groove 70Y that extends in a circumferential direction is formed on an outer circumference face of the eccentric rotation member 72Y. The cylindrical roller bearings 16Y are disposed between the groove 70Y and the center through hole 25Y of the external gear 18Y. Since a part of the respective cylindrical roller bearing 16Y is housed within the groove 70Y, the movement of the cylindrical roller bearings 16Y in the axial direction is restricted.

A preload adjustment member 27 is disposed between the supporting member 42Y and the outer race 6Y. The preloaded pressure between the pair of supporting members 42X and 42Y and the crank member 14 can be adjusted appropriately by the preload adjustment member 27. The numbers 52X and 52Y respective refers to retainer for retaining the respective cylindrical roller bearing 16X and 16Y. As shown in FIG. 2, twenty cylindrical roller bearings 16Y are retained by the retainer 52Y. Similarly, twenty cylindrical roller bearings 16X are retained by the retainer 52X. A through hole 58 is formed in the shaft 60 of the crank member 14, this through hole 58 extending along the axis line 56 of the shaft 60.

Characteristics of the gear transmission 10 of the present embodiment will be described below with reference to FIGS. 3 and 4.

Figure 4:
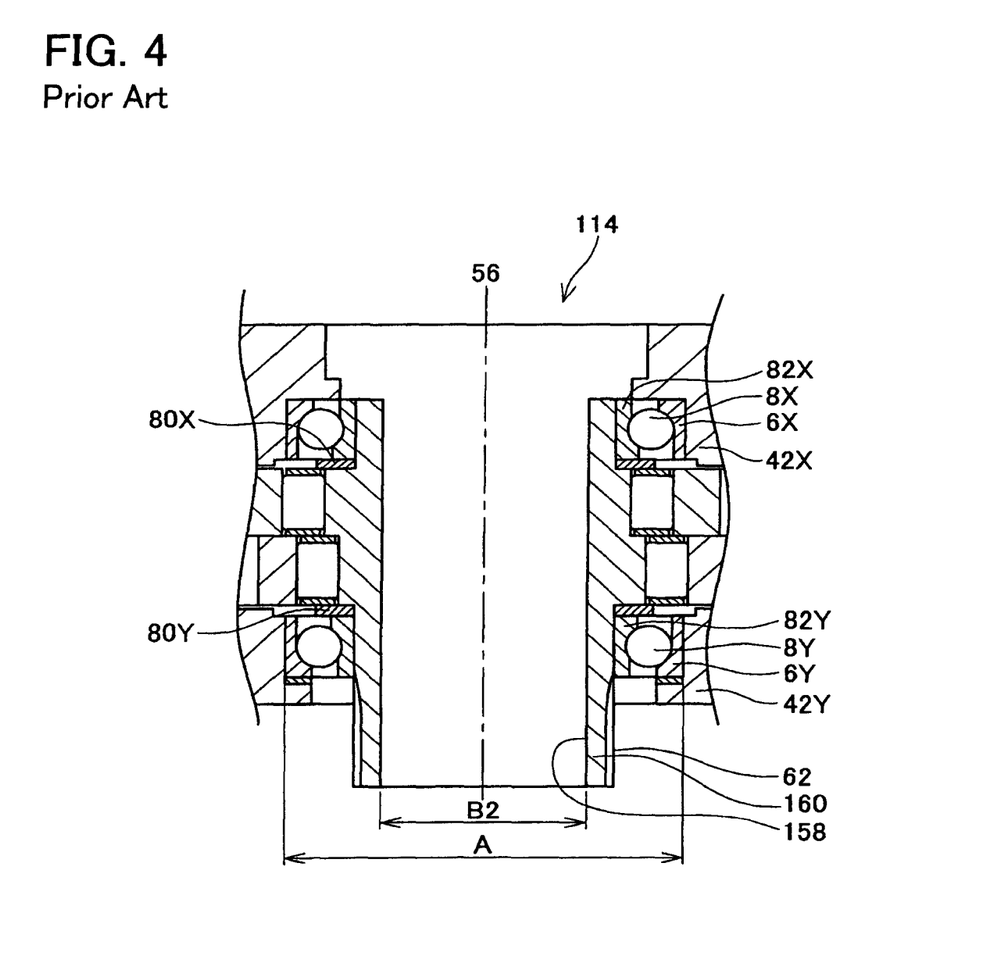
FIG. 4 shows an enlarged view of a crank member of a conventional gear transmission and the surroundings of the crank member.

FIG. 4 shows an enlarged view of a crank member 114 of a conventional gear transmission and the surroundings of the crank member 114. Moreover, the crank member 114 is showing the correspondence between the characteristics of the crank member of the conventional gear transmission and the crank member 14 of the gear transmission of the present embodiment, and is not totally identical with the crank member utilized in the aforementioned Patent Document.

In the conventional gear transmission, an inner race 82X, rolling elements 8X, and an outer race 6X are disposed between the crank member 114 and the carrier 42 in order to support the crank member 114 such that the crank member 114 can rotate with respect to the pair of supporting members 42X and 42Y. Further, a stopping member 80X is also disposed for restricting the movement of the inner race 82X in the axial direction. Similarly, the conventional gear transmission has an inner race 82Y, rolling elements 8Y, an outer race 6Y, and a stopping member 80Y. However, the gear transmission 10 of the present embodiment does not have the inner races 82X and 82Y or the stopping members 80X and 80Y. That is, it is possible to considerably reduce the number of parts of the gear transmission 10 of the present embodiment compared to the conventional gear transmission. Further, as described above, comparing the conventional crank member 114 that has the inner races 82X and 82Y with the crank member 14 of the present embodiment (see FIG. 3) that does not have the inner races 82X and 82Y, if the inner diameter of the through hole 58 of the crank member 14 is B1, the inner diameter of a through hole 158 of the crank member 114 is B2, and the outer diameter of the outer races 6X and 6Y of both crank members is A, then the crank member 14 can have a larger inner diameter than the crank member 114. That is, a relationship of B1>B2 can be obtained. As a result, the crank member 14 can maintain sufficient space for a large amount of wiring, piping, etc. to pass through.

When the shaft 60 of the crank member 14 rotates, the eccentric rotation members 72X and 72Y rotate eccentrically. That is, as shown in FIG. 2, an axis line of rotation 54 of the eccentric rotation member 72Y revolves orbitally around the axis line 56 of the shaft 60 as shown by the arrow 55. The arrow 55 does not show the orbital revolution radius of the axis line of rotation 54 with respect to the axis line 56, but only shows the direction of orbital revolution. The actual orbital revolution radius is identical to the offset distance between the axis line of rotation 54 and the axis line 56. When the eccentric rotation member 72Y revolves orbitally around the axis line 56, the external gear 18Y revolves orbitally with respect to the internal gear 48 around the axis line 56 of the internal gear 48, in the direction of the arrow 55.

When the external gear 18Y revolves orbitally around the axis line 56 while in a meshing state with the internal gear 48, the external gear 18Y rotates with respect to the internal gear 48. When the external gear 18Y rotates, the carrier 42 rotates with respect to the internal gear 48.

Other characteristics of the gear transmission 10 will be described with reference to FIG. 1.

As described above, the pair of additional grooves 41X and 41Y is formed on the pair of supporting members 42X and 42Y at positions facing the internal gear 48. The pair of supporting members 42X and 42Y is supported so as to be capable of rotating with respect to the internal gear 48 and incapable of moving in the axial direction of the internal gear 48 by the respective outer races (the second outer races) 22X and 22Y, the respective balls (the third rolling elements) 20X and 20Y, and the respective additional grooves 41X and 41Y. That is, the inner races are herein omitted, and the number of parts constituting the gear transmission 10 is thus reduced. Moreover, it is possible to reduce the distance between the internal gear 48 and the pair of supporting members 42X and 42Y. That is, the diameter of the internal gear 48 can be reduced. The gear transmission 10 can thereby be made more compact.

The cylindrical member 34 is fixed to the input side member 40 which is attached the motor 28 by the bolt 36. That is, the cylindrical member 34 does not rotate with respect to the motor 28. In the case where wiring, piping, etc. passes through a through hole 32 of the cylindrical member 34, it is often the case that the wiring, piping, etc. that has passed through the through hole 32 is bundled together with wiring, etc. that is connected with the motor 28. Since the cylindrical member 34 does not rotate with respect to the motor 28, it is possible to prevent adding a load to the bundled wiring, etc.

As shown in FIG. 1, the input gear 30 is fixed to a lower part of the crank member. A through hole (not shown) is formed in a center of the input gear 30, and a spline hole is formed on an inner surface of this through hole. The spline hole of the input gear 30 meshes with the spline 62 formed on the shaft 60 of the crank member 14 that is shown in detail in FIG. 3. That is, since the input gear 30 is formed on an outer surface of the shaft 60, the rotation of the motor or the like can be transmitted to the crank member 14 while maintaining the space of the through hole 58.

The input gear 30 meshes with the motor gear 26 that rotates together with an output shaft of the motor 28. The motor 28 is fixed to the input side member 40. The input side member 40 and the internal gear 48 are fixed by a bolt 44. The output side member 2 and the supporting member 42X are fixed by a bolt 4.

The oil seal 12 is disposed between the cylindrical member 34 and the supporting member 42X. Further, an oil seal 50 is disposed between the internal gear 48 and the supporting member 42X. Oil that has been filled into the gear transmission 10 can be prevented from leaking to the exterior of the gear transmission 10 by the oil seals 12 and 50.

As shown in FIG. 2, the number of teeth of the external gear 18Y is less than the number of teeth of the internal gear 48. The external gear 18Y revolves orbitally around the axis line 56 of the internal gear 48 as shown by the arrow 55 while the outer teeth in the circumferential direction of the external gear 18Y maintain a meshing state with the inner gear pins 24 disposed in the circumferential direction of the internal gear 48. When the rotation of the internal gear 48 is not allowed (i.e. when the rotation of the input side member 40 is not allowed), the external gear 18Y rotates in a direction opposite to the arrow 55 while revolving orbitally within the internal gear 48 in the direction of the arrow 55. When the external gear 18Y rotates, the twelve column-shaped members 46 revolve orbitally following the rotation of the external gear 18Y. When the column-shaped members 46 revolve, the output side member 2 fixed to the supporting member 42X rotates around the axis line 56 of the internal gear. Alternatively, in a case where the rotation of the external gear 18Y is not allowed (i.e. a case in which the rotation of the output side member 2 is not allowed), the external gear 18Y revolves orbitally around the axis line 56 of the internal gear 48 as shown by the arrow 55. When the external gear 18Y revolves orbitally, the internal gear 48 rotates in the direction of the arrow 55. When the internal gear 48 rotates, the input side member 40 fixed to the internal gear rotates around the axis line 56 of the internal gear 48. In the case where the rotation of the external gear 18Y is not allowed, the motor 28 also rotates around the axis line 56 of the internal gear 48. Further, the pair of supporting members 42X and 42Y does not rotate, nor revolve orbitally.

In the present embodiment, the number of teeth of the internal gear 48 is thirty, and the number of teeth of the external gear 18Y is twenty-nine. When the rotation of the internal gear 48 is not allowed, thirty orbital revolutions of the external gear 18Y make one rotation of the external gear 18Y. On the other hand, in a case where the rotation of the external gear 18Y is not allowed, thirty orbital revolutions of the external gear 18Y make one rotation of the internal gear 48.

The above description of the external gear 18Y is also applied to the external gear 18X, except that the direction of being eccentric with respect to the axis line 56 is the opposite direction. In FIG. 2, an axis line of rotation of the eccentric rotation member 72X of the external gear 18X and the axis line of rotation 54 of the eccentric rotation member 72Y of the external gear 18Y are at opposite sides with the axis line 56 between the two. That is, the external gear 18Y and the external gear 18X are disposed in symmetrical positions with respect to the axis line 56. The external gear 18Y and the external gear 18X thereby realize a relationship in which rotational balance is ensured.

In the gear transmission 10 of the present embodiment, the rotation of the motor gear 26 fixed to the output shaft of the motor 28 causes the input gear 30 to rotate around the axis line 56 of the crank member 14. The rotation speed of the output shaft of the motor 28 can be changed and made to rotate the crank member 14 by adjusting the difference in the number of teeth between the motor gear 26 and the input gear 30. That is, the rotation speed of the output shaft of the motor 28 can be decreased, and the rotation speed of the output shaft of the motor 28 can be increased. When the number of teeth of the motor gear 26 and the input gear 30 is identical, the output shaft of the motor 28 can rotate the crank member 14 without there being any change in the rotation speed of the output shaft of the motor 28. Further, in the gear transmission 10 of the present embodiment, the rotation of the output shaft of the motor 28 is transmitted to the crank member 14 utilizing gears. However, the rotation of the output shaft of the motor can be transmitted to the crank member utilizing a pulley or the like.

When the crank member 14 rotates, the eccentric rotation members 72X and 72Y of the crank member 14 revolve orbitally around the axis line 56. When the eccentric rotation members 72X and 72Y revolve orbitally, the external gears 18X and 18Y revolve orbitally in the direction of the arrow 55 (see FIG. 2) while maintaining a meshing state with the internal gear 48 via the inner gear pins 24. With the rotation of the internal gear 48 being restricted, the external gears 18X and 18Y rotate in the direction opposite to the arrow 55 while revolving orbitally in the direction of the arrow 55 while meshing with the internal gear 48. When the external gears 18X and 18Y rotate, the pair of supporting members 42X and 42Y rotates around the axis line 56 in the direction opposite to the arrow 55. Alternatively, when the rotation of the external gears 18X and 18Y is restricted, the external gears 18X and 18Y revolve orbitally in the direction of the arrow 55 while in a meshing state with the internal gear 48 via the inner gear pins 24. When the external gears 18X and 18Y revolve orbitally, the internal gear 48 rotates around the axis line 56 in the direction of the arrow 55.

The ratio of the rotation speed of the crank member 14 and the rotation speed of an output member of the gear transmission 10 can be changed by adjusting the number of teeth of the external gears 18X and 18Y and the internal gear 48 (in the case where the rotation of the external gears 18X and 18Y is restricted, the output member is equivalent to the input side member 40. In the case where the rotation of the internal gear 48 is restricted, the output member is equivalent to the output side member 2).

(Second Embodiment)

A gear transmission of the present embodiment will be described with reference to FIG. 5. The gear transmission of the present embodiment is a variant of the gear transmission 10 in which only the configuration of the crank member and the surroundings of the crank member differ. Only the parts differing from those of the gear transmission 10 will be herein described. Members that are the same as those of the gear transmission 10 will have the same reference numbers applied thereto, and a description thereof will be omitted.

Figure 5:
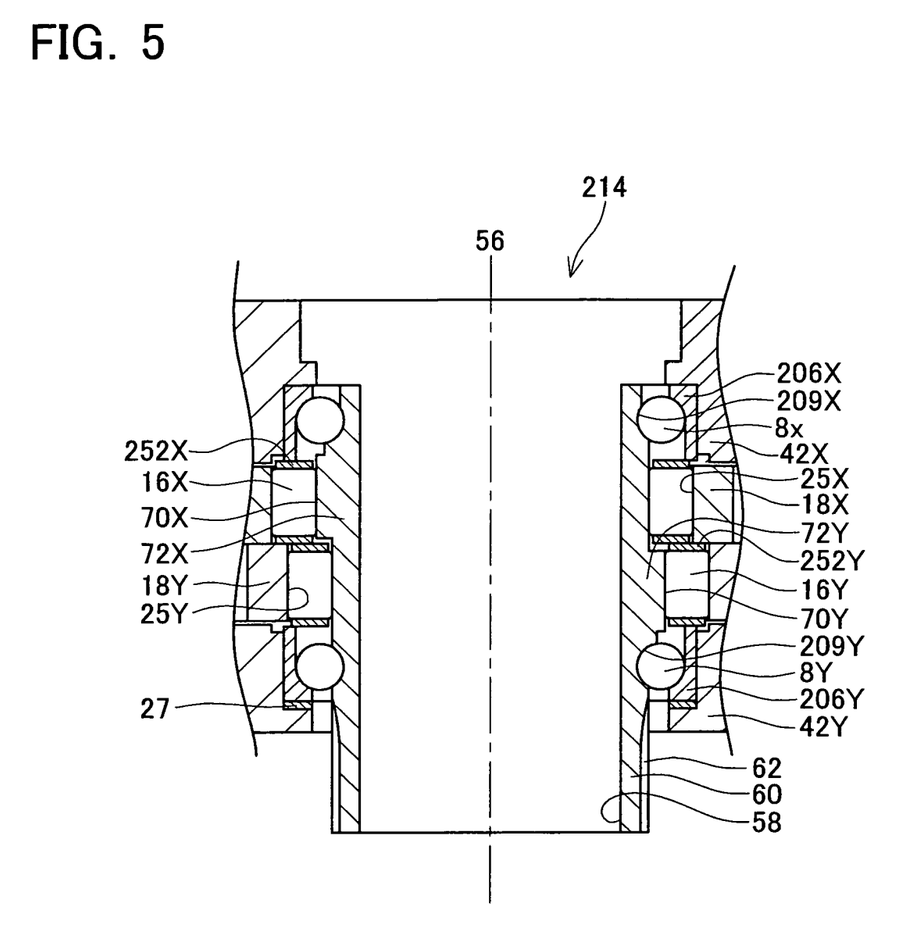
FIG. 5 shows an enlarged view of a crank member of a gear transmission of a second embodiment and the surroundings of the crank member.

In a crank member 214 shown in FIG. 5, grooves are not formed on the outer circumference faces of the eccentric rotation members 72X and 72Y. The cylindrical roller bearings 16X are disposed between the eccentric rotation member 72X and the external gear 18X. The cylindrical roller bearings 16X are housed in a retainer 252X. Outer races (first outer races) 206X make contact with the retainer 252X, and the cylindrical roller bearings 16X are restricted the movement in the direction of the axis line 56 of the crank member 214. The cylindrical roller bearings 16Y are disposed between the eccentric rotation member 72Y and the external gear 18Y. The cylindrical roller bearings 16Y are housed in a retainer 252Y. Outer races 206Y make contact with the retainer 252Y, and the cylindrical roller bearings 16Y are restricted the movement in the direction of the axis line 56 of the crank member 214.

In the gear transmission of the present embodiment, each of the outer races 206X make contact with the respective retainer 252X of the cylindrical roller bearings 16X. A space may be formed between the outer race 206X and the retainer 252X within a range allowing movement of the cylindrical roller bearings 16X in the axial direction. Similarly, a space may be formed between the outer race 206Y and the retainer 252Y within a range allowing movement of the cylindrical roller bearings 16Y in the axial direction. That is, with the movement of the cylindrical roller bearings 16X and 16Y in the axial direction, variation thereof will suffice so long as undesirable effects for the operation of the gear transmission are prevented.

(Third Embodiment)

A gear transmission of the present embodiment will be described with reference to FIG. 6. The gear transmission of the present embodiment is a variant of the gear transmission 10 in which only the configuration of the crank member and the surroundings of the crank member differ. Only the parts differing from those of the gear transmission 10 will be herein described. Members that are the same as those of the gear transmission 10 will have the same reference numbers applied thereto, and a description thereof will be omitted.

Figure 6:
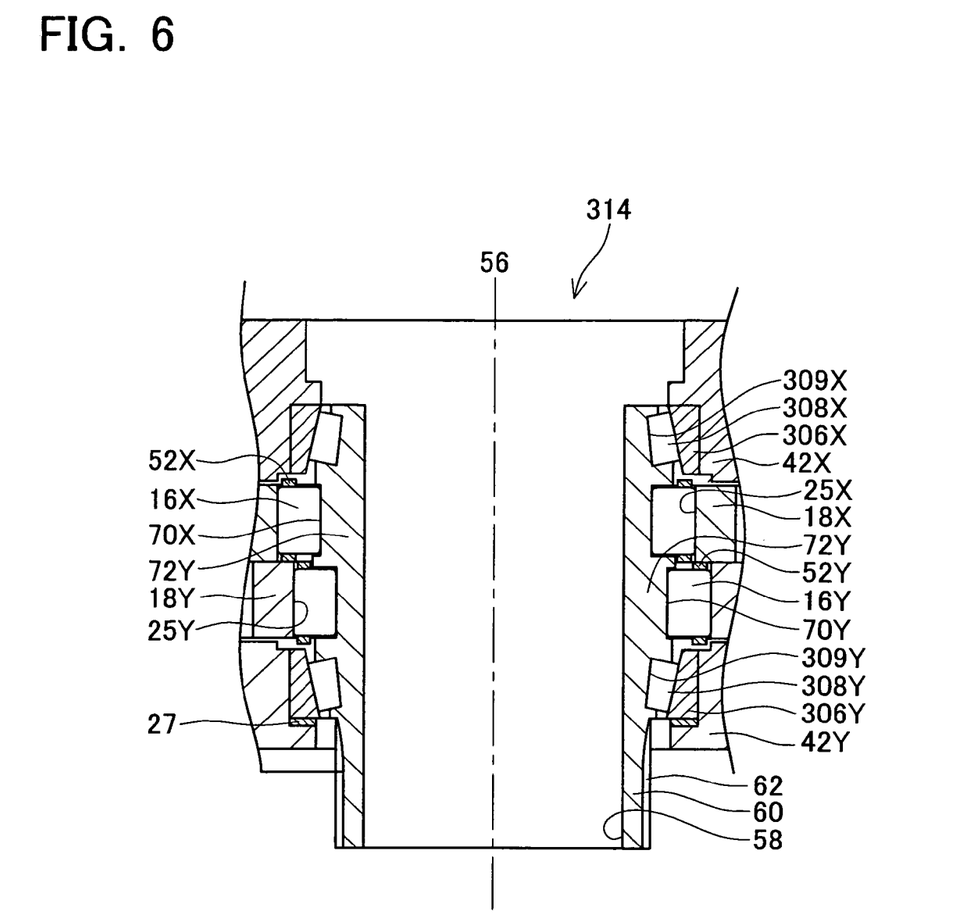
FIG. 6 shows an enlarged view of a crank member of a gear transmission of a third embodiment and the surroundings of the crank member.

In a crank member 314 shown in FIG. 6, a pair of grooves 309X and 309Y is formed on the outer surface of the shaft 60 at positions having the eccentric rotation members 72X and 72Y interleaved therebetween. Rollers (rolling elements) 308X and an outer race 306X are disposed between the groove 309X and the supporting member 42X. Rollers 309Y and an outer race 306Y are disposed between the groove 309Y and the supporting member 42Y. The crank member 314 can be supported so as to be capable of rotating with respect to the pair of supporting members 42X and 42Y and incapable of moving in its axial direction, by the groove 309X, the roller 308X and the outer race 306X and by the groove 309Y, the roller 308Y and the outer race 306Y, respectively.

Comparing the gear transmission of the present embodiment with the gear transmission 10, the shape of the grooves 309X and 309Y formed on the shaft 60 of the crank member 314 differs from the shape of the grooves 9X and 9Y formed on the shaft 60 of the crank member 14, the rolling elements (rollers) 308X and 308Y differ from the rolling elements (balls) 8X and 8Y, and the shape of the outer races 306X and 306Y differs from the shape of the outer races 6X and 6Y. The shape of grooves can be selected in accordance with the size or with the desired performance of the gear transmission.

(Fourth Embodiment)

A gear transmission 410 of the present embodiment will be described with reference to FIG. 7. The gear transmission 410 is a variant of the gear transmission 10, and only the parts differing from those of the gear transmission 10 will be described. Members that are the same as those of the gear transmission 10 will have the same reference numbers applied thereto, and a description thereof will be omitted.

In the gear transmission 410, the output side member 2 and the cylindrical member 34 are fixed by a bolt 436. The cylindrical member 34 rotates with respect to the internal gear 48 at the same speed as the output side member 2. An oil seal 412 is disposed between the cylindrical member 34 and the input side member 40 fixed to the motor 28. Oil that has been filled into the gear transmission 410 can be prevented from leaking to the exterior of the gear transmission 410 by the oil seal 412.

The output side member of the gear transmission 410 may be disposed at a lower side relative to the direction of gravity. The oil that has been filled into the gear transmission 410 readily leaks downwards in the direction of gravity. Since the output side member 2 and the cylindrical member 34 do not rotate with respect to one another, the gear transmission 410 has the characteristic that the oil that has been filled into the gear transmission 410 does not easily leak out.

The selection of whether the cylindrical member 34 should be fixed to the output side member 2 or to the input side member 40 can be made in accordance with the aim and intended use of the gear transmission.

Specific embodiments of the present invention are described above, but these merely illustrate some possibilities of the invention and do not restrict the claims thereof. The art set forth in the claims includes variations and modifications of the specific examples set forth above.

In the embodiments described above, the through hole is formed in the center of the crank member. However, in the case where wiring, piping, etc. is not passed through the interior of the gear transmission, the through hole does not need to be formed. The through hole may be formed in accordance with the aim and intended use of the gear transmission.

In the embodiments described above, two external gears have been utilized, and these external gears are symmetrically eccentric with respect to the axis line of the internal gear. However, the number of external gears is not restricted to two. The number of external gears may be one, or may be three or more. If the number of external gears is reduced, the length of the gear transmission in its axial direction can be reduced. If the number of external gears is increased, the rotational balance of the gear transmission can be improved. The number of external gears can be selected in accordance with the aim and intended use of the gear transmission.

In the above embodiments, there is a difference of one in the number of teeth of the internal gear and the external gear. However, the difference in number of teeth between the internal gear and the external gear is not restricted to one. The difference in number of teeth may be two, or may be three or more. In the case for example where the difference in number of teeth between the internal gear and the external gear is two, when the external gear makes one orbital revolution around the center of the internal gear, the external gear makes 2/(the number of teeth of the internal gear) rotations with respect to the internal gear.

The technical elements disclosed in the specification or the drawings may be utilized separately or in all types of combinations, and are not limited to the combinations set forth in the claims at the time of filing of the application. Furthermore, the technology illustrated in the present specification or the drawings may simultaneously achieve a plurality of objects, and has technological utility by achieving one of those objects.

The invention claimed is:
1. A gear transmission comprising:
an internal gear;
an external gear having a number of teeth differing from a number of teeth of the internal gear, being configured to revolve orbitally around a first axis line of the internal gear in a meshing state with the internal gear, and having a center through hole at its center and an offset through hole at a position offset from its center;

a carrier having a column-shaped member and a pair of supporting members, wherein the column-shaped member passes through the offset through hole of the external gear, and each one of the pair of supporting members supports a respective end of the column-shaped member and is supported by the internal gear in a state allowing the pair of supporting members to rotate around the first axis line of the internal gear;

a crank member having a shaft and an eccentric rotation member, wherein the shaft passes through the center through hole of the external gear and a pair of first grooves is formed on the surface of the shaft at positions between which the eccentric rotation member is interleaved, and the eccentric rotation member has a second axis line of rotation at a position offset from a third axis line of the shaft and is fixed in the center through hole of the external gear; and first rolling elements and first outer races arranged between the supporting members of the carrier and the first grooves of the crank member, wherein the first axis line and the third axis line are coaxial, each first groove has a first edge and a second edge, the first edge of a respective one of the first grooves is positioned on an outer side of the shaft relative to the second edge of the respective one of the first grooves in a direction along the second axis line, a first diameter of the shaft at a position where the first edge of the respective one of the first grooves is formed is smaller than a second diameter of the shaft at a position where the second edge of the respective one of the first grooves is formed, and the shaft of the crank member is supported such that the shaft is configured to rotate with respect to the carrier and its movement in an axial direction of the carrier is restricted, and wherein radially inward portions of each of the first rolling elements directly contact each of the first grooves, respectively, and radially outward portions of each of the first rolling elements interact with each of the first outer races, respectively.

2. The gear transmission according to claim 1, wherein
a through hole extending along the third axis line of the crank member is formed on the shaft of the crank member.

3. The gear transmission according to claim 1, wherein
a second groove extending along a circumferential direction is formed on an outer surface of the eccentric rotation member, and second rolling elements are arranged between the second groove and the center through hole of the external gear.

4. The gear transmission according to claim 1, wherein
second rolling elements are arranged between the eccentric rotation member and the center through hole of the external gear, and movement of the second rolling elements in an axial direction of the crank member is restricted by the first outer races.

5. The gear transmission according to claim 1, wherein
a pair of additional grooves is formed on the pair of supporting members at positions facing the internal gear, and third rolling elements and second outer races are arranged between the internal gear and the pair of additional groove, and the pair of supporting members is supported such that the pair of supporting members is capable of rotating with respect to the internal gear and their movement in an axial direction of the internal gear is restricted.

* * * * *